US012697813B2

(12) United States Patent
Kim et al.

(10) Patent No.: US 12,697,813 B2
(45) Date of Patent: Aug. 4, 2026

(54) INKJET PRINTING HEAD

(71) Applicant: Samsung Display Co., LTD., Yongin-si (KR)

(72) Inventors: Jaesik Kim, Yongin-si (KR); Seungyong Song, Yongin-si (KR); Wooyong Sung, Yongin-si (KR); Seungho Yoon, Yongin-si (KR); Hyoungsub Lee, Yongin-si (KR); Hyemin Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 195 days.

(21) Appl. No.: 18/411,201

(22) Filed: Jan. 12, 2024

(65) Prior Publication Data

US 2024/0316927 A1 Sep. 26, 2024

(30) Foreign Application Priority Data

Mar. 24, 2023 (KR) ........................ 10-2023-0039048
May 11, 2023 (KR) ........................ 10-2023-0061263

(51) Int. Cl.
*B41J 2/14* (2006.01)
*B41J 2/175* (2006.01)

(52) U.S. Cl.
CPC ......... *B41J 2/14209* (2013.01); *B41J 2/1433* (2013.01); *B41J 2/17523* (2013.01); *B41J 2002/14217* (2013.01); *B41J 2202/03* (2013.01)

(58) Field of Classification Search
CPC .. B41J 2/14209; B41J 2/1433; B41J 2/17523; B41J 2002/14217; B41J 2202/03
See application file for complete search history.

(56) References Cited

U.S. PATENT DOCUMENTS 8,004,078 B1 * 8/2011 Song .......................... C09J 7/38 562/58
8,501,277 B2 8/2013 Kobrin et al.
8,801,146 B2 8/2014 Sung et al.
9,065,072 B2 6/2015 Song et al.
9,972,583 B2 5/2018 Kobrin et al.
2002/0135643 A1 * 9/2002 Sarojiniamma ........ B41J 2/1632 347/68

(Continued)

FOREIGN PATENT DOCUMENTS

KR 1020170032960 A 3/2017
KR 101970361 B1 4/2019

(Continued)

*Primary Examiner* — Jason S Uhlenhake
(74) *Attorney, Agent, or Firm* — CANTOR COLBURN LLP

(57) ABSTRACT

An inkjet printing head, includes: a chamber configured to store ink; a spray assembly, which is disposed under the chamber, and defines an ink transport path therein connected to an inner portion of the chamber, where ink that passes through the ink transport path is discharged to the outside through a bottom surface of the spray assembly; a first self-assembly monolayer covering the bottom surface of the spray assembly; an adhesive layer disposed between the bottom surface of the spray assembly and the first self-assembly monolayer and including a metal-carbon composition; and an inorganic material layer disposed between the adhesive layer and the first self-assembly monolayer.

20 Claims, 13 Drawing Sheets

(56) References Cited

U.S. PATENT DOCUMENTS

| | | | | |
|---|---|---|---|---|
| 2013/0335483 | A1* | 12/2013 | Sung | B41J 2/1603 347/45 |
| 2017/0077445 | A1 | 3/2017 | Han | |
| 2022/0204800 | A1* | 6/2022 | Pousthomis | C09D 11/322 |

FOREIGN PATENT DOCUMENTS

| | | | |
|---|---|---|---|
| KR | 1020190099890 | A | 8/2019 |
| KR | 102016579 | B1 | 9/2019 |

* cited by examiner

| STRUCTURE | Contact Angle (w/D.I) | SUPERFICIAL ENERGY (mN/m) | Pencil Hardness (On Glass) |
| --- | --- | --- | --- |
| PFA /SiOC /PI |  | 19~20 | B~3B |
| SAM1 /ALD /SiOC /PI *(DEPOSITION AFTER REMOVING PFA) |  | 14.45 | 9H |

FIG. 12

<table>
<tr><td></td><td>Bare Head</td></tr>
<tr><td>NOZZLE SURFACE AND INNER WALL Coating Layer</td><td>- NOZZLE SURFACE: PFA/SiOC/PI<br>- INNER WALL (AN INCLINED SURFACE) : PI</td></tr>
<tr><td></td><td>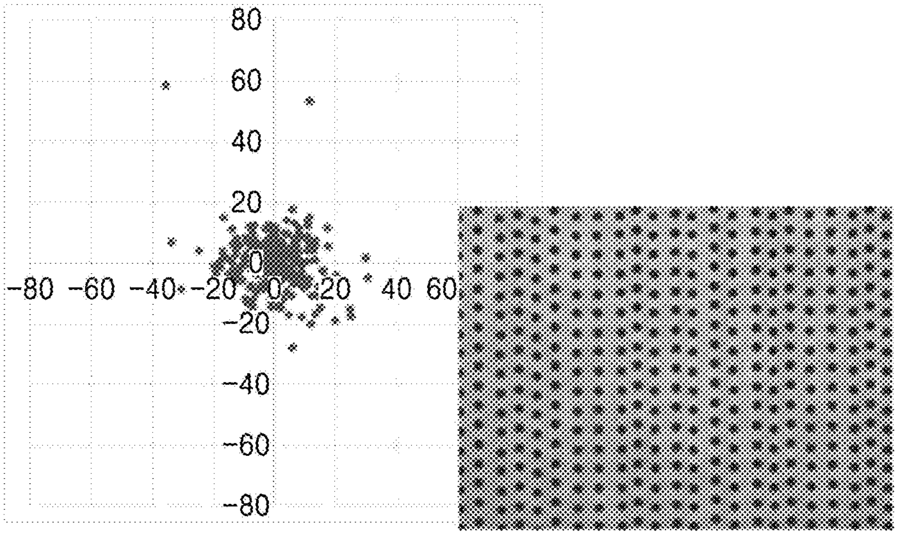
</td></tr>
<tr><td>Drop Accuracy (@1mm)</td><td>
<table>
<tr><td></td><td>x</td><td>y</td></tr>
<tr><td>σ</td><td>9.91㎛</td><td>9.03㎛</td></tr>
<tr><td>%(<14㎛)</td><td>93.4%</td><td>96.9%</td></tr>
</table>
</td></tr>
</table>

FIG. 13

<table>
<tr><td></td><td>Coating Head #1</td></tr>
<tr><td>NOZZLE SURFACE AND INNER WALL Coating Layer</td><td>- NOZZLE SURFACE: SAM1/ALD/SiOC/PI<br>- INNER WALL: SAM2/ALD/PI</td></tr>
<tr><td></td><td>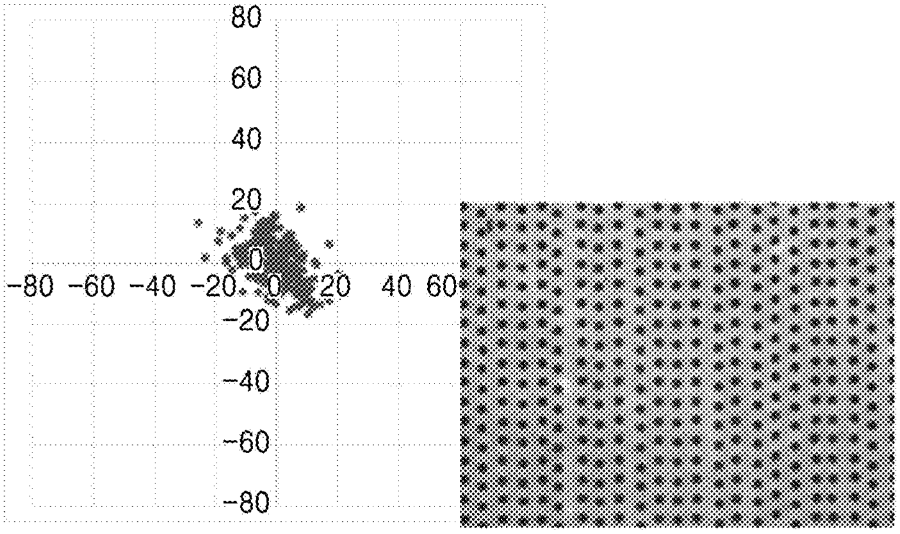
</td></tr>
<tr><td>Drop Accuracy (@1mm)</td><td><table><tr><td></td><td>x</td><td>y</td></tr><tr><td>σ</td><td>7.48㎛</td><td>7.02㎛</td></tr><tr><td>%(<14㎛)</td><td>96.5%</td><td>96.5%</td></tr></table></td></tr>
</table>

INKJET PRINTING HEAD

This application claims priority to Korean Patent Application No. 10-2023-0039048, filed on Mar. 24, 2023, and Korean Patent Application No. 10-2023-0061263, filed on May 11, 2023, and all the benefits accruing therefrom under 35 U.S.C. § 119, the contents of which in their entirety are herein incorporated by reference.

BACKGROUND

1. Field

One or more embodiments relate to an inkjet printing head, and more particularly, to an inkjet printing head having improved durability.

2. Description of the Related Art

Metal materials such as copper, gold, and silver, ceramic, polymers, as well as general dyes, have been used as printing solutions for industrial inkjet printers. Industrial inkjet printers have been used for industrial graphics, display, solar battery technologies in a method of directly printing on various objects such as substrates, films, woven products, and displays. Particularly, in the field of display technology, processes using inkjet printers have been applied to manufacturing of color filters, orientation processes of liquid crystals, manufacturing of organic emission layers, manufacturing of quantum-dot emission-layers, and the like. An inkjet printing device includes an inkjet printing head including at least one ink transport path (or a nozzle).

However, the ink transport path is likely to be clogged as the inkjet printing head is used. To prevent the aforementioned problem, after performing a printing process, a process of physically or chemically cleaning a portion of the inkjet printing head for discharging ink may be performed. However, due to the cleaning process, the portion for discharging the ink may be damaged.

SUMMARY

One or more embodiments include an inkjet printing head with improved durability. However, the technical goal is only an example, and the scope of the disclosure is not limited thereto.

Additional aspects will be set forth in part in the description which follows and, in part, will be apparent from the description, or may be learned by practice of the presented embodiments of the disclosure.

According to one or more embodiments, an inkjet printing head includes: a chamber configured to store ink; a spray assembly, which is disposed under the chamber, and defines an ink transport path therein connected to an inner portion of the chamber, where ink that passes through the ink transport path is discharged to the outside through a bottom surface of the spray assembly; a first self-assembly monolayer covering the bottom surface of the spray assembly; an adhesive layer disposed between the bottom surface of the spray assembly and the first self-assembly monolayer and including a metal-carbon composition; and an inorganic material layer disposed between the adhesive layer and the first self-assembly monolayer.

The inkjet printing head may further include a second self-assembly monolayer covering at least a portion of an inner surface of the ink transport path.

The adhesive layer may include carbon 1 weight percent (wt %) to 50 wt %.

The metal-carbon composition may include aluminum oxide.

The adhesive layer may be disposed between an inner surface of the ink transport path and the second self-assembly monolayer.

The spray assembly may further include a piezoelectric element layer disposed under the chamber and a nozzle plate, which is disposed under the piezoelectric element layer and of which a bottom surface is the bottom surface of the spray assembly.

The piezoelectric element layer may define, as a portion of the ink transport layer, a first nozzle portion connected to an inner portion of the chamber, the nozzle plate may define, as another portion of the ink transport path, a second nozzle portion connected to the first nozzle portion and penetrating the bottom surface of the nozzle plate, and an average diameter of the first nozzle portion may be greater than an average diameter of the second nozzle portion.

The nozzle plate may define, as a portion of the second nozzle portion, a 2-1 nozzle portion connected to the first nozzle portion, and a 2-2 nozzle portion connected to the 2-1 nozzle portion and penetrating the bottom surface of the nozzle plate, as another portion of the second nozzle portion, and an average diameter of the 2-1 nozzle portion may be greater than an average diameter of the 2-2 nozzle portion.

A diameter of the 2-1 nozzle portion may decrease in a direction toward the 2-2 nozzle portion from the first nozzle portion.

The second self-assembly monolayer may cover an inner surface of the first nozzle portion and an inner surface of the second nozzle portion.

The inorganic material layer may include a first part disposed between the adhesive layer and the first self-assembly monolayer to cover the bottom surface of the nozzle plate and a second part disposed between the adhesive layer and the second self-assembly monolayer to cover an inner surface of the 2-2 nozzle portion.

The second self-assembly monolayer may cover an inner surface of the first nozzle portion and an inner surface of the 2-1 nozzle portion, and the first self-assembly monolayer may cover an inner surface of the 2-2 nozzle portion.

The inorganic material layer disposed between the adhesive layer and the first self-assembly monolayer may cover the bottom surface of the nozzle plate.

A deionized water (DI) contact angle of the first self-assembly monolayer may be equal to or greater than 10° and smaller than or equal to 200°.

A DI contact angle of the second self-assembly monolayer may be equal to or greater than 10° and smaller than or equal to 130°.

The inorganic material may include silicon (Si), the first self-assembly monolayer may include a first composition, in which a first head group including Si faces the inorganic material layer and which includes a first tail group in which a hydrophobic function group is exposed outside, and the first head group and the first tail group may be connected to each other by a first carbon chain.

The inkjet printing head may further include a second self-assembly monolayer covering at least a portion of an inner surface of the ink transport path, the second self-assembly monolayer may include a second compound in which a second head group including Si faces the inorganic material layer and which includes a second tail group in which a hydrophobic function group is exposed outside, and the second head group and the second tail group are connected to each other by a second carbon chain, and a length of the first carbon chain may be less than or equal to a length of the second carbon chain.

The ink may include an ink composition including zinc (Zn).

The ink may include zinc selenide (ZnSe).

The chamber may include a mesh layer arranged in parallel with the bottom surface of the spray assembly in the chamber, and a metal layer disposed under the mesh layer in parallel with the mesh layer in the chamber, wherein a surface of the mesh layer and a surface of the metal layer may be coated with the second self-assembly monolayer, and the adhesive layer may further be disposed between the surfaces of the mesh layer and the coated second self-assembly monolayer and between the metal layer and the coated second self-assembly monolayer.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 is a diagram illustrating a shot group of the inkjet printing head according to the Comparative Example and the accuracy of the shot group; and FIG. 13 is a diagram illustrating a shot group of an inkjet printing head according to an embodiment and accuracy of the shot group.

DETAILED DESCRIPTION

Figure 1:
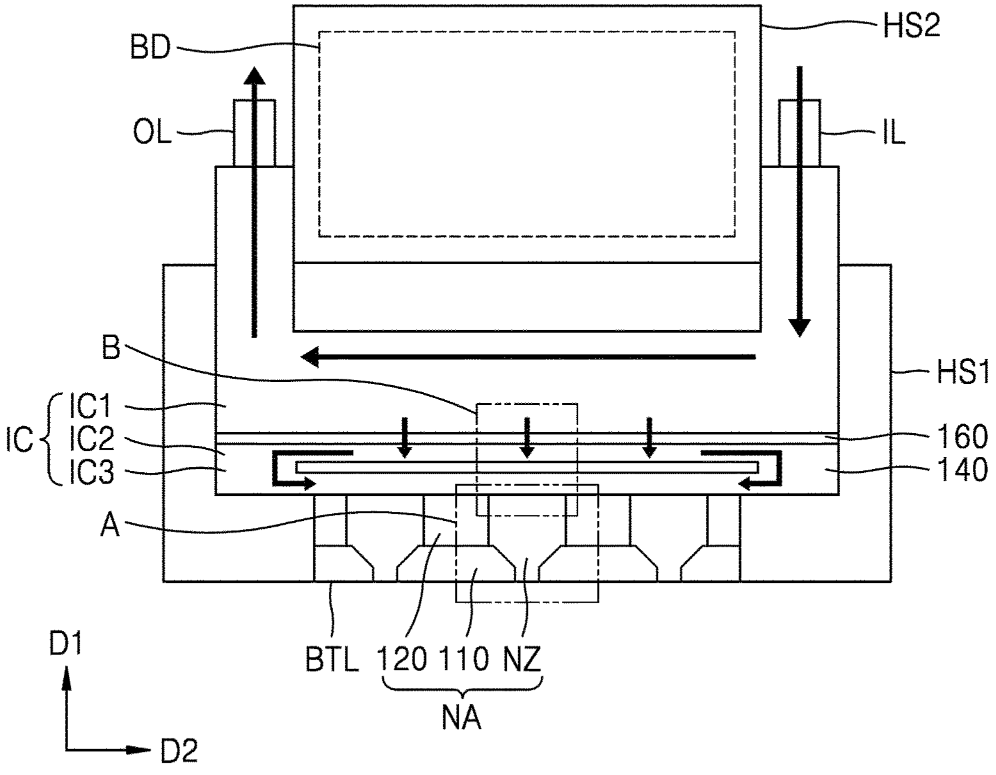
FIG. 1 is a cross-sectional view schematically illustrating a cross-section of an inkjet printing head according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "Or" means "and/or." As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the following embodiments, when a portion such as a layer, a film, an area, or a component is "on" or "above" another portion, the portion may be "directly" on the other portion, or other components may be located therebetween. In the drawings, the sizes of components may be exaggerated or reduced for convenience of description. For example, since the size and thickness of each component is arbitrarily shown in the drawings for convenience of description, the disclosure is not necessarily limited to those illustrated.

An x-axis, a y-axis, and a z-axis are not limited to three axes on an orthogonal coordinate system, and may be interpreted as a wide meaning including the same. For example, the x-axis, y-axis, and z-axis may be orthogonal to one another, but may also refer to different directions that are not orthogonal to one another.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, an inkjet printing head according to an embodiment will be described in detail according to the descriptions.

FIG. 1 is a cross-sectional view schematically illustrating a cross-section of an inkjet printing head according to an embodiment.

The inkjet printing head according to an embodiment may be used for printing devices configured to print using ink such as a quantum-dot ink composition.

As shown in FIG. 1, the inkjet printing head may include a chamber IC for storing inkjet printing ink and a spray assembly NA for discharging the inkjet printing ink from the chamber IC to the outside. The chamber IC and the spray assembly NA may be included in a first housing HS1 of the inkjet printing head. The first housing HS1 may be connected to a second housing HS2, and a driving circuit BD may be included in the second housing HS2. The driving circuit BD may be configured to control a piezoelectric element layer 121 to be described later.

The ink for the inkjet printing head may be injected into the chamber IC through an ink inlet IL and may be discharged from the chamber IC to the outside through an ink outlet OL. Like this, the ink may mainly move through a route of the ink inlet IL-the chamber IC-the ink outlet OL. The ink inlet IL may penetrate the first housing HS1 and communicate the chamber IC to inject the ink into the chamber IC, and the ink outlet OL may penetrate the first housing HS1 and communicate the chamber IC to discharge the ink from the chamber IC. The ink inlet IL and the ink outlet OL may be open or closed according to necessity, and opening and closing thereof may be manually or automatically controlled.

The chamber IC for storing the ink may include a first chamber IC1 connected to the ink inlet IL and the ink outlet OL, a second chamber IC2 separated from the first chamber IC1 by a mesh layer 160, and a third chamber IC3 in which at least a central area thereof is separated from the second chamber IC2 by a metal layer 140. Therefore, the second chamber IC2 and the third chamber IC3 may share a connected space in an area outside the metal layer 140 in which the metal layer 140 is not arranged.

The ink may be filtered by the mesh layer 160 in the first chamber IC1 and move to the second chamber IC2. The ink that has moved to the second chamber IC2 may have been removed of impurities after the filtering. The ink may move from the second chamber IC2 to the third chamber IC3, and due to the metal layer 140 separating at least the central area of the third chamber IC3 from the second chamber IC2, the ink may move to the spray assembly NA through the area outside the metal layer 140 (i.e., a space in which the second chamber IC2 and the third chamber IC3 are connected to each other). The ink may be discharged to the outside of the spray assembly NA through the ink transport path of the spray assembly NA.

The spray assembly NA may discharge the ink outside through a bottom surface BTL of the spray assembly NA. The ink transport path NZ may penetrate the bottom surface BTL of the spray assembly NA. The ink transport path NZ, which is a nozzle, may be controlled to discharge an appropriate amount of ink to the outside.

That is, the spray assembly NA may be arranged under the chamber IC, may define the ink transport path NZ therein connected to inside of the chamber IC, and may discharge the ink, which has passed through the ink transport path NZ, through the bottom surface BTL.

The spray assembly NA may include the piezoelectric element layer 121 and a nozzle plate 111 disposed under the piezoelectric element layer 121. The piezoelectric element layer 121 may include a piezoelectric material, e.g., lead zirconate titanate ("PZT"). The piezoelectric element layer 121 may be controlled in response to an electrical signal delivered from the driving circuit BD, and may include a piezoelectric actuator configuration known in the field. In an embodiment, the nozzle plate 111 may include an organic material such as polyimide (PI), and may include a metal material such as stainless use steel ("SUS"), iron (Fe), chromium (Cr), and nickel (Ni). The nozzle plate 111 may extend in a horizontal direction (i.e., D2 in FIG. 1)

The spray assembly NA may define the ink transport path NZ therein penetrating the piezoelectric element layer 121 and the nozzle plate 111. The ink transport path NZ may have a bottleneck structure. Accordingly, a pressure of the ink discharged through the ink transport path NZ may increase while transported through the ink transport path NZ.

Figure 2:
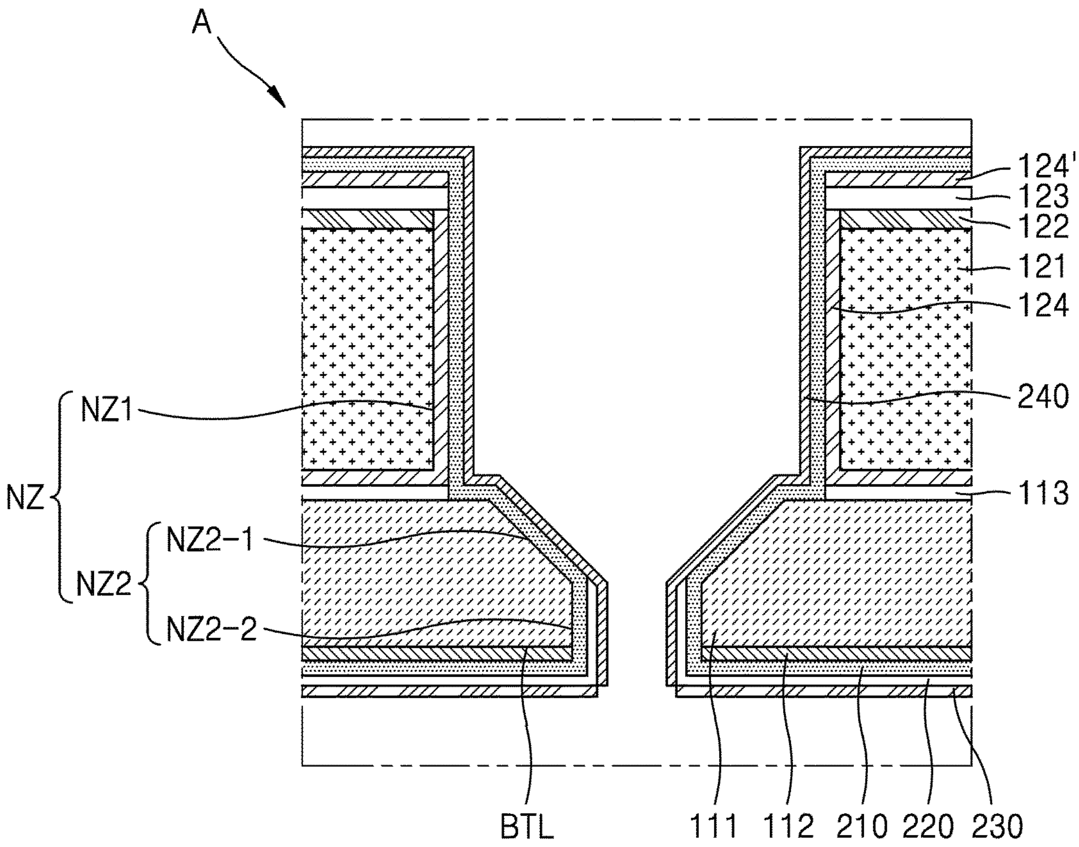
FIG. 2 is a cross-sectional view schematically illustrating an enlarged image of an example of a portion A shown in FIG. 1.

FIG. 2 is a cross-sectional view schematically illustrating an enlarged image of an example of a portion A shown in FIG. 1.

As shown in FIG. 2, the inkjet printing head according to an embodiment may include an adhesive layer 210, an inorganic material layer 220, and a first self-assembly monolayer 230. The adhesive layer 210, the inorganic material layer 220, and the first self-assembly monolayer 230, which are coating layers included in a multi-layered structure, may coat and protect a surface of a target.

The bottom surface BTL of the spray assembly NA may be covered by the first self-assembly monolayer 230. That is, the bottom surface BTL of the spray assembly NA may be coated and protected by the first self-assembly monolayer 230.

The first self-assembly monolayer 230 may include a first compound including a first head group including silicon (Si) and a first tail group exposed outside. In this case, the first head group and the first tail group may be connected to each other by a first carbon chain.

The first head group may include a structure in which at lest one of Methoxy ($-OCH_3$), chlorine (Cl), and hydrogen ($-H$) si is coupled to a central Si. The first head group may be arranged to face the bottom surface BTL of the spray assembly NA, and may be adhere to the inorganic material layer 220 to be described later.

In an embodiment, the first tail group may include a structure in which at least one of $-F$, $-CF$, $-CF_2$, and $-CF_3$ is coupled to a central carbon (C). The first tail group may be hydrophobic and prevent condensation of the ink. A DI contact angle of the first self-assembly monolayer 230 including the first tail group may be equal to or greater than 10° and smaller than or equal to 200°. That is, desirably, the first tail group may include a function group including fluoride (F). Accordingly, the first tail group has a lower adsorption ratio, and accordingly, the possibility that impurities are likely to remain on a surface decreases. As used herein, the "DI contact angle" is defined as a "contact angle of deionized water".

The first carbon chain may have a chain structure including eight or more and fifty or less carbon atoms. The number of carbon atoms in the first carbon chain may be modified according to necessity. The first carbon chain may be arranged in parallel to other neighboring carbon chains.

The first self-assembly monolayer 230 may be formed using sputtering method, physical vapor deposition ("PVD") method, chemical vapor deposition ("CVD") method, or the like.

The adhesive layer 210 may be disposed between the bottom surface BTL of the spray assembly NA and the first self-assembly monolayer 230. The adhesive layer 210, which is one of layers included in the coating layers of the multi-layered structure, may adhere a target of coating to other layers. To adhere to various components, the adhesive layer 210 may include a metal-carbon composition.

In an embodiment, for example, the adhesive layer 210 may include carbon of 1 weight percent (wt %) to 50 wt %. By containing a certain amount of carbon, the metal-carbon composition may be more durable the adhesive layer 210 including the metal or the metal oxide.

In an embodiment, for example, the adhesive layer 210 may include an aluminum oxide ($Al_xO_x$), and may include a function group coupled to $Al_xO_x$ and including C. The metal-carbon composition of the adhesive layer 210 may include a hydrocarbon function group ($C_xH_x$) coupled to aluminum (Al). Accordingly, the adhesive layer 210 according to an example may include $Al_xO_x(C_xH_x)$. When the hydrocarbon function groups ($C_xH_x$) are further added to the metal-carbon composition, oxygen (O) atoms may be removed as much as the amount of added hydrocarbon function groups.

In an embodiment, for example, contents of compositions included in the adhesive layer 210 may be in numerical ranges as shown in Table 1 below.

TABLE 1

| a content of aluminum (Al) | a content of carbon (C) | a content of oxygen (O) |
|---|---|---|
| 40 to 60 wt % | 1 to 50 wt % | 1 to 60 wt % |

—Numerical Ranges of Contents of Compositions Included in the Adhesive Layer 210—

Here, a reference of calculating wt % is a total weight of the adhesive layer 210 that is a target of composition analysis, and other elements such as hydrogen, in addition to Al, C, and O, may be further included in the adhesive layer 210.

However, the features of the adhesive layer 210 may be controlled by adjusting the content of carbon, and the control on the content of carbon may be simultaneously performed with control on a content of oxygen. For example, one oxygen in a covalent bond with Al may be debonded, and a carbon atom may be in a covalent bond with Al, in the place of the oxygen that has been debonded. Accordingly, when the content of carbon may increase, a content of oxygen may decrease, and the content of carbon and the content of oxygen may be inversely proportional.

In an embodiment, for example, a thickness of the adhesive layer 210 may be equal to greater than about 10 nanometers (nm) and less than or equal to about 50 nm. As a distance between a top surface and the bottom surface BTL of the bottom surface BTL may be about 75 um, the adhesive layer 210 may be considerably thinner than the nozzle plate 111.

The adhesive layer 210 may be formed using sputtering method, CVD method, atomic layer deposition ("ALD") method, or the like. However, as other components (e.g., the nozzle plate 111 including PA) may be influenced in a high-temperature process, the adhesive layer 210 may also be formed using low-temperature CVD method or ALD method.

The inorganic material layer 220 may be disposed between the adhesive layer 210 and the first self-assembly monolayer 230. In an embodiment, the inorganic material layer 220 may include an intermediate layer including silicon (Si). As described above, the first head group of the first self-assembly monolayer 230 may be arranged to face the inorganic material layer 220. As the first head group includes Si that is a same material as the inorganic material layer 220, adhesion between the inorganic material layer 220 and the first self-assembly monolayer 230 may be enhanced.

As shown in FIG. 2, the inkjet printing head according to an embodiment may further include a second self-assembly monolayer 240 covering at least a portion of an inner surface of the ink transport path NZ.

At least the portion of the inner surface of the ink transport path NZ may be covered by the second self-assembly monolayer 240. That is, at least the portion of the inner surface of the ink transport path NZ may be coated and protected by the second self-assembly monolayer 240.

The second self-assembly monolayer 240 may include a second compound which includes a second head group including Si and a second tail group exposed outside. In this case, the second head group and the second tail group may be connected to each other by a second carbon chain.

The second head group may include a structure in which at least one of $—OCH_3$, Cl, and —H are coupled to a central Si. The second head group may be arranged to face the inner surface of the ink transport path NZ.

The second tail group may have a structure in which at least one of —H, —CH, $—CH_2$, $—CH_3$, —F, —CF, $—CF_2$, and $—CF_3$ is coupled to a central C. The second tail group may be hydrophobic and prevent condensation of ink. A DI contact angle of the second self-assembly monolayer 240 including the second tail group may be equal to or greater than 10° and smaller than or equal to 130°. Desirably, the second tail group may include hydrocarbon. As the second self-assembly monolayer 240 is to be formed in the ink transport path NZ, the second self-assembly monolayer 240 may include a material that costs less and is easier to form than a material of the first self-assembly monolayer 230 formed on the bottom surface BTL.

The second carbon chain may have a chain structure including two or more and fifty or less carbons atoms. The number of carbon atoms in the second carbon chain may be different according to necessity. The second carbon chain may be arranged in parallel to other neighboring carbon chains.

For example, the number of carbon atoms included in the second carbon chain may be less than or equal to the number of carbon atoms included in the first carbon chain. This is because the first carbon chain, which is arranged to face the outside of the spray assembly NA, may need a structure firmer than a structure of the second carbon chain.

In an embodiment, for example, the DI contact angle of the second self-assembly monolayer 240 including the second tail group may be smaller than or equal to the DI contact angle of the first self-assembly monolayer 230 including the first tail group. This is because the first self-assembly monolayer 230 is arranged on the bottom surface BTL facing the outside of the spray assembly NA and thus hydrophobicity stronger than hydrophobicity of the second self-assembly monolayer 240 may be required for the first self-assembly monolayer 230.

The adhesive layer 210 may be disposed between the bottom surface BTL and the second self-assembly monolayer 240 of the spray assembly NA. The adhesive layer 210, which is a layer same as the adhesive layer 210 described above, may include a layer obtained by extension of the adhesive layer 210 disposed between the bottom surface BTL of the spray assembly NA and the first self-assembly monolayer 230. Therefore, the features of the adhesive layer 210 disposed between the bottom surface BTL of the spray assembly NA and the second self-assembly monolayer 240 are as described above.

For example, the second self-assembly monolayer 240 may be formed using sputtering method, PVD method, CVD method, or the like.

As described above, the spray assembly NA may include the piezoelectric element layer 121 disposed under the chamber IC and the nozzle plate 111 disposed under the piezoelectric element layer 121. A bottom surface of the nozzle plate 111 may include a bottom surface of the spray assembly NA, or may be included in at least a portion of the bottom surface BTL of the spray assembly NA.

The piezoelectric element layer 121 may define, as a portion of the ink transport path NZ, a first nozzle portion NZ1 connected to the inner portion of the chamber IC. The first nozzle portion NZ1 may penetrate the piezoelectric element layer 121. The first nozzle portion NZ1 may be connected to the third chamber IC3 described above, and may receive the ink from the third chamber IC3 and transport the ink. The first nozzle portion NZ1 may be defined by an inner surface of the piezoelectric element layer 121, the adhesive layer 210 covering the inner surface of the piezoelectric element layer 121, and/or the second self-assembly monolayer 240.

An inner surface of the first nozzle portion NZ1 may further include a separate coating layer. In an embodiment, for example, the inner surface of the first nozzle portion NZ1 may be coated with an Al compound layer. An example of the Al compound may include AlOF. The Al compound may be damaged by particles in the ink. According to occasions, the Al compound may be peeled off by the particles in the ink and cause clogging of the first nozzle portion NZ1. Accordingly, the inner surface of the first nozzle portion NZ1 has to be further coated.

An average diameter of the first nozzle portion NZ1 may be greater than an average diameter of a second nozzle portion NZ2 to be described later. Like this, as the average diameter of the first nozzle portion NZ1 is greater than the average diameter of the second nozzle portion NZ2 to be described later, the ink moving from the first nozzle portion NZ1 to the second nozzle portion NZ2 may receive a higher pressure and be discharged outside the spray assembly NA. As used herein, the "diameter" is measured in a plan view (i.e., view in a vertical direction D1).

The nozzle plate 111 may include, as another portion of the ink transport path NZ, the second nozzle portion NZ2 connected to the first nozzle portion NZ1 and penetrating the bottom surface of the nozzle plate 111. The nozzle plate 111 may define: a 2-1 nozzle portion NZ2-1 connected to the first nozzle portion NZ1, as a portion of the second nozzle portion NZ2; and a 2-2 nozzle portion NZ2-2 connected to the 2-1 nozzle portion NZ2-1 and penetrating the bottom surface of the nozzle plate 111, as another portion of the second nozzle portion NZ2.

The second nozzle portion NZ2 may be defined by an inner surface of the nozzle plate 111, the adhesive layer 210 covering the inner surface of the nozzle plate 111, and/or the second self-assembly monolayer 240.

The 2-1 nozzle portion NZ2-1 may be defined by an inner side inclining toward the bottom surface of the nozzle plate 111 in the inner surface of the nozzle plate 111. Accordingly, a diameter of the 2-1 nozzle portion NZ2-1 may decrease in a direction from the first nozzle portion NZ1 toward the 2-2 nozzle portion NZ2-2.

The 2-2 nozzle portion NZ2-2 may be defined by a through hole extending from an end of the inner surface inclining toward the bottom surface of the nozzle plate 111 in the inner surface of the nozzle plate 111 to the bottom surface of the nozzle plate 111. The 2-2 nozzle portion NZ2-2 may be defined as a portion of the inner surface of the nozzle plate 111, i.e., an inner surface of a portion from an end of the 2-1 nozzle portion NZ2-1 to the bottom surface of the nozzle plate 111, and the 2-2 nozzle portion NZ2-2 may include a portion of an ink transport path extending in a vertical direction (e.g., D1 in FIG. 1) with reference to the bottom surface of the nozzle plate 111. Therefore, a diameter of the 2-2 nozzle portion NZ2-2 may have an approximately constant size from the 2-1 nozzle portion NZ2-1 to the bottom surface of the nozzle plate 111.

Here, an average diameter of the 2-1 nozzle portion NZ2-1 may be greater than an average diameter of the 2-2 nozzle portion NZ2-2. That is, according to structures of the 2-1 nozzle portion NZ2-1 and the 2-2 nozzle portion NZ2-2, the ink moving from the 2-1 nozzle portion NZ2-1 to the 2-2 nozzle portion NZ2-2 may receive a higher pressure and be discharged outside the spray assembly NA. That is, the 2-1 nozzle portion NZ2-1 and the 2-2 nozzle portion NZ2-2 may together form a bottleneck structure.

Here, the inorganic material layer 220 described not only may be arranged between the adhesive layer 210 and the first self-assembly monolayer 230 to cover the bottom surface of the nozzle plate 111, but also may be arranged between the adhesive layer 210 and the second self-assembly monolayer to cover an inner surface of the 2-2 nozzle portion NZ2-2.

The piezoelectric element layer 121 may adhere to the nozzle plate 111 by an adhesive material layer 113. The adhesive material layer 113 may include, e.g., a layer including epoxy. A surface of the adhesive material layer 113 may adhere to a bottom surface of the piezoelectric element layer 121, and another surface of the adhesive material layer 113 may adhere to the top surface of the nozzle plate 111.

In addition, a metal electrode layer 122 may be disposed on a top surface of the piezoelectric element layer 121. The metal electrode layer 122 may include a metal material such as Al. The metal electrode layer 122 may be electrically connected to the driving circuit BD described above and receive an electrical signal from the driving circuit BD. The metal electrode layer 122 may be configured to deliver an electrical signal to the piezoelectric element layer 121 according to the electrical signal that has been received.

A side surface of the piezoelectric element layer 121 and the bottom surface of the piezoelectric element layer 121 may be coated by an organic coating layer 124. In an embodiment, for example, the organic coating layer 124 may include a parylene coating layer. Parylene may protect the piezoelectric element layer 121 from numerous harmful materials, and particularly, due to low moisture permeability, has an excellent effect in waterproof or moisture-proof.

A transparent layer 123 may be disposed on the top surface of the piezoelectric element layer 121 and a top surface of the organic coating layer 124 covering the top surface of the piezoelectric element layer 121. In an embodiment, for example, the transparent layer 123 may include glass component. An additional organic coating layer 124' may be disposed on a top surface of the transparent layer 123. For example, the additional organic coating layer 124' may include a layer identical to the organic coating layer 124 described above, i.e., a parylene coating layer.

Like this, the adhesive layer 210 described above may cover the organic coating layer 124, which coats the piezoelectric element layer 121 and the transparent layer 123, and the additional organic coating layer 124'. More particularly, the adhesive layer 210 may cover a side surface of the organic coating layer 124 and side surfaces and a top surface of the additional organic coating layer 124' covering the top surface of the piezoelectric element layer 121 and the transparent layer 123. In addition, the adhesive layer 210 may also cover a side surface of the transparent layer 123 exposed between the organic coating layer 124 and the additional organic coating layer 124'. Furthermore, the adhesive layer 210 may also cover a side surface of the adhesive material layer 113 exposed between the piezoelectric element layer 121 (or the organic coating layer 124) and the nozzle plate 111.

A silicon oxide film 112 may be disposed on the bottom surface of the nozzle plate 111. In an embodiment, for example, the silicon oxide film 112 may include SiOC. The ink transport path NZ (the second nozzle portion NZ2 and the 2-1 nozzle portion NZ2-1) may penetrate the silicon oxide film 112 and the nozzle plate 111.

For example, the silicon oxide film 112 may be formed using sputtering method, PVD method, or the like.

According to an embodiment, the PFA layer may be disposed on a bottom surface of the silicon oxide film 112. However, as the PFA layer is fragile to physical impacts, the aforementioned multi-layered coating layer (e.g., the adhesive layer 210, the inorganic material layer 220, and the first self-assembly monolayer 230) may be formed after removing the PFA layer. That is, after purchasing a complete product in which the PFA layer is formed, may only remove the PFA layer and form the multi-layered coating layer in the place of the PFA layer that has been removed.

Hereinafter, the PFA layer disclosed in the inkjet printing device according to the Comparative Example may include a coating layer used in an inkjet printing head 1024*i* SHE model (a model launched after the second half of 2019) manufactured by KONICA MINOLTA, Inc., which is a coating layer including CFO as a composition.

The ink discharged from the inkjet printing head described above may include a quantum-dot ink composition. The ink according to the present embodiment may include a (quantum-dot) ink composition including zinc (Zn). In an embodiment, for example, the ink may include zinc selenide (ZnSe).

The ZnSe may be a material mainly used for a green-based or red-based quantum-dot ink composition. Like in the following experiments, when an ink including ZnSe is used, clogging in the inner portion of the nozzle may occur due to particles included in the ink. Therefore, the inkjet printing head according to the present embodiment may be used with the ink including the quantum-dot ink composition including Zn.

Although not shown, a planarization layer (not shown) may be disposed between the silicon oxide film 112 and the adhesive layer 210. In an embodiment, for example, the planarization layer (not shown) may include parylene. As described above, the organic coating layer 124 including parylene may be arranged with reference to the piezoelectric element layer 121, and therefore, the planarization layer (not shown) may be disposed between the silicon oxide film 112 and the adhesive layer 210 to cover the bottom surface of the nozzle plate 111.

Figure 3:
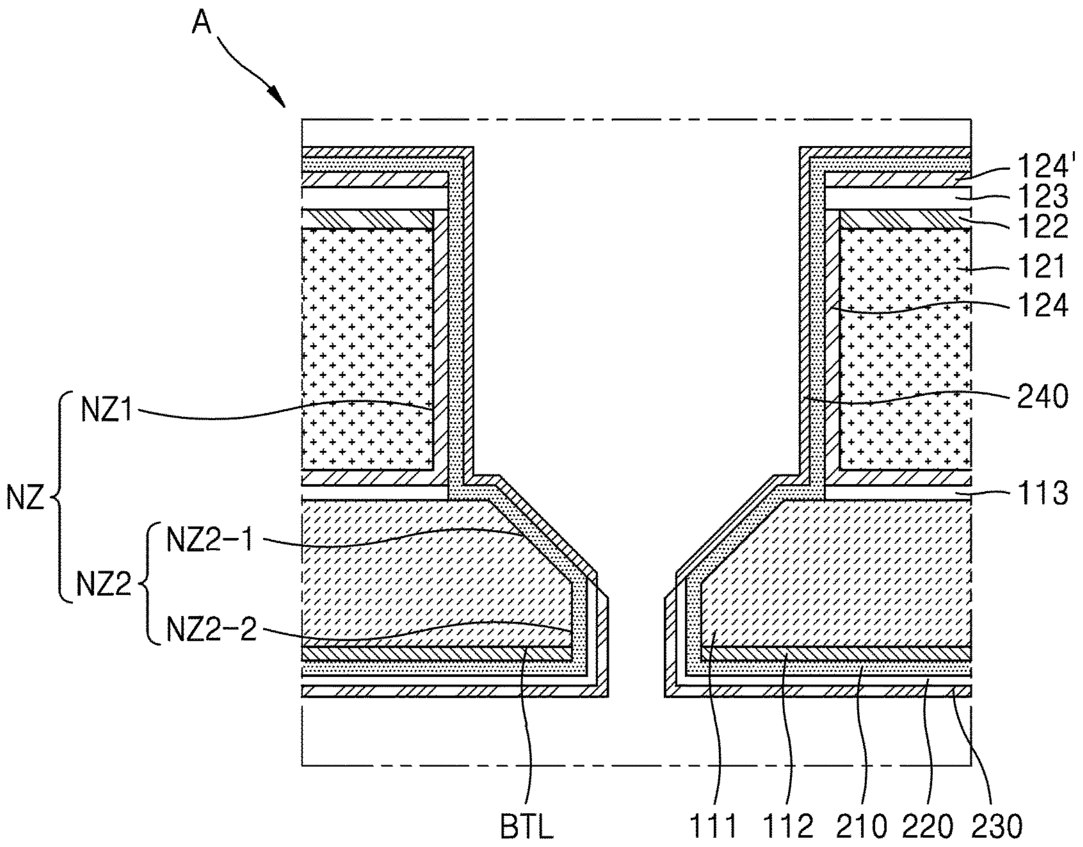
FIG. 3 is a cross-sectional view schematically illustrating an enlarged image of another example of the portion A shown in FIG. 1.

FIG. 3 is a cross-sectional view schematically illustrating an enlarged image of another example of the portion A shown in FIG. 1. For reference, from descriptions of FIG. 3, descriptions identical to those described above may be not given.

As described above, the second self-assembly monolayer 240 may cover the inner surface of the first nozzle portion NZ1 and an inner surface of the 2-1 nozzle portion NZ2-1, and the first self-assembly monolayer 230 may cover the inner surface of the 2-2 nozzle portion NZ2-2. That is, the first self-assembly monolayer 230 not only may cover the bottom surface BTL of the spray assembly NA but also may cover the inner surface of the 2-2 nozzle portion NZ2-2.

Figure 4:
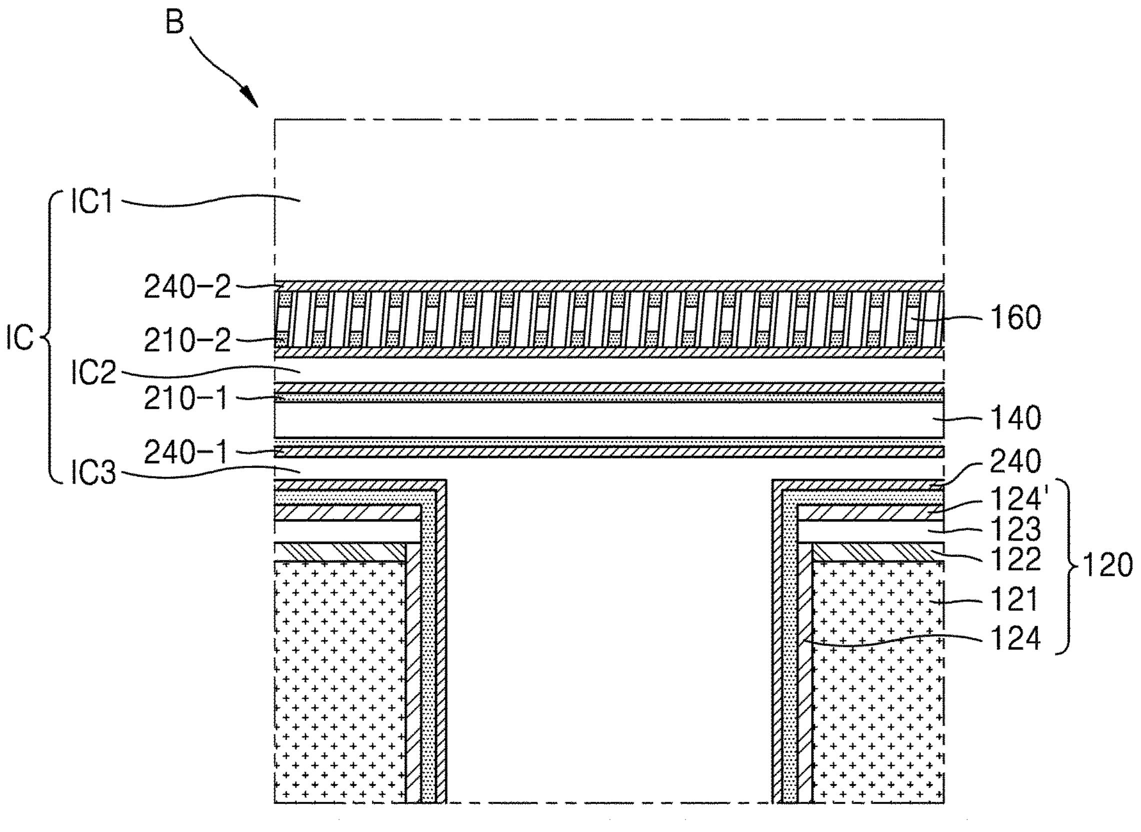
FIG. 4 is a cross-sectional view schematically illustrating an enlarged image of an example of a portion B shown in FIG. 1.

FIG. 4 is a cross-sectional view schematically illustrating an enlarged image of an example of a portion B shown in FIG. 1.

As shown in FIG. 4, the mesh layer 160 and the metal layer 140 described above may also be coated. The chamber IC may include the mesh layer 160 arranged in parallel to the bottom surface BTL of the spray assembly NA in the chamber IC, and may also include the metal layer 140 arranged in parallel to the mesh layer 160 under the mesh layer 160 in the chamber IC.

A surface of the mesh layer 160 and a surface of the metal layer 140 may be coated or covered with the second self-assembly monolayer 240-1 and 240-2 described above. In this case, an entire portion of an inner surface of each mesh hole included in a mesh structure of the mesh layer 160 may be coated or covered with the second self-assembly monolayer 240.

The adhesive layer 210-2 and 210-1 described above may be disposed between the surface of the mesh layer 160 and the coated second self-assembly monolayer 240-2 and between the surface of the metal layer 140 and the coated second self-assembly monolayer 240-1. The inorganic material layer 220 described above may be arranged between the adhesive layer 210-1 and 210-2 and the second self-assembly monolayer 240-1 and 240-2 in another embodiment.

FIGS. 5 to 8 are photographs showing degree of clogging in the inner portion of the nozzle according to an ink composition after using the inkjet printing head according to the Comparative Example for a certain period of time. The inner portion of the nozzle in the photographs shown in FIGS. 5 to 8 is that of the inkjet printing head according to the Comparative Example, in which the adhesive layer 210, the inorganic material layer 220, the first self-assembly monolayer 230, and the second self-assembly monolayer 240 are not formed compared with the inkjet printing head according to an embodiment.

Instead, the bottom surface BTL of the spray assembly NA of the inkjet printing head according to the Comparative Example may be covered with a PFA layer. The PFA layer may cover a bottom surface of the nozzle plate 111 including PI and the like, and the silicon oxide film 112 may be disposed between the PFA layer and the bottom surface of the nozzle plate 111 included in the Comparative Example.

In addition, according to occasions, a portion of the inner surface of the ink transport path NZ disclosed in the inkjet printing device according to the Comparative Example may be covered by a layer including AlOF and/or Pt.

Figure 5:
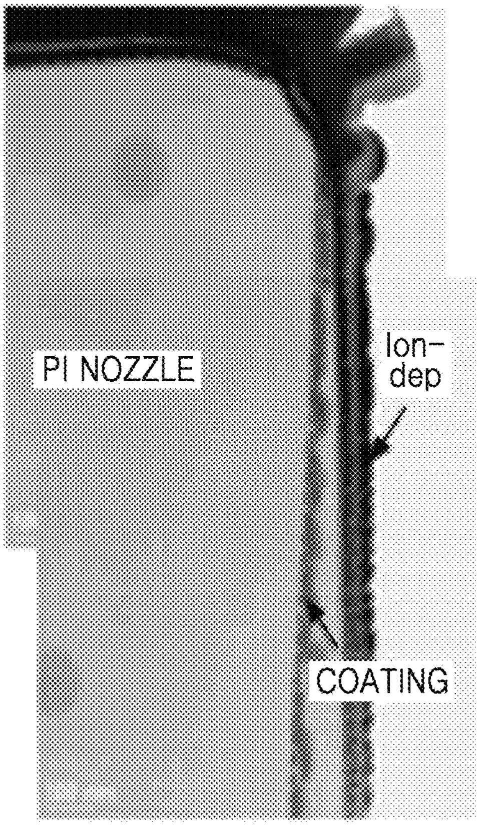
FIGS. 5 to 8 are photographs of degrees of clogging in a nozzle due to an ink composition after using an inkjet printing head according to a Comparative Example for a certain period of time.

FIG. 5 illustrates a non-used inkjet printing head according to the Comparative Example. In this case, it is found that the inner surface of the nozzle plate 111 including PI is formed into the form of the Chinese character "-".

Figure 6:
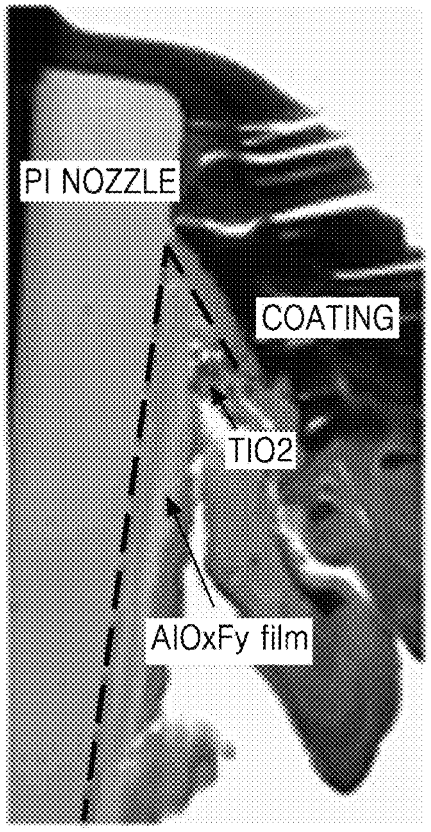

FIG. 6 is a photograph of an enlarged image of a nozzle portion of the inkjet printing head according to the Comparative Example, which shows a result of performing a printing operation for a certain period time using a green-based ink.

Generally, an ink composition including zinc is included in a large amount in a green-based ink composition. As shown in FIG. 6, when the green-based ink has been used for a certain period of time, it was found that clogging occurred in the nozzle due to materials of a coating layer of the inner surface of the nozzle and AlOF, ZnSe, TiO, and the like included in the particles in the ink.

Figure 7:
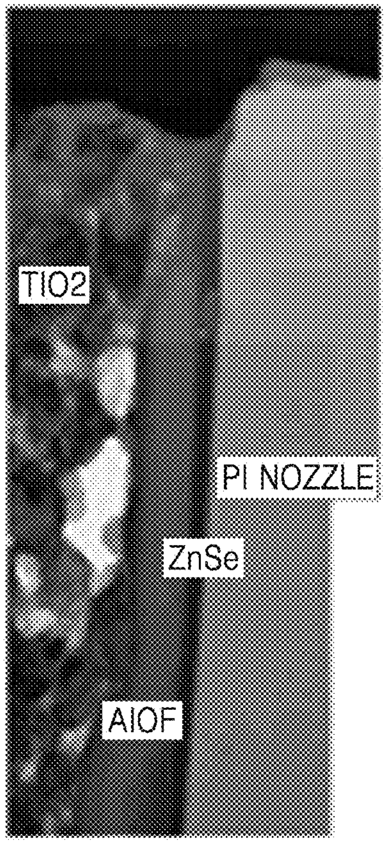

FIG. 7 is a photograph of an enlarged image of the nozzle portion of the inkjet printing head according to the Comparative Example, which shows a result of performing a printing operation for a certain period of time using a red-based ink.

Generally, although not as much as in the green-based ink composition, the ink composition including Zn is included in a large amount in a red-based ink composition. As shown in FIG. 7, when the red-based ink has been used for a certain period of time, it was found that clogging occurred in the nozzle due to materials of the coating layer of the inner surface of the nozzle and AlOF, ZnSe, TiO; and the like included in the particles in the ink. However, as the red-based ink composition having a relative less content of ZnSe has been used, it was found that the inner portion of the nozzle shown in FIG. 7 is less clogged than the inner portion of the nozzle portion shown in FIG. 6.

Figure 8:
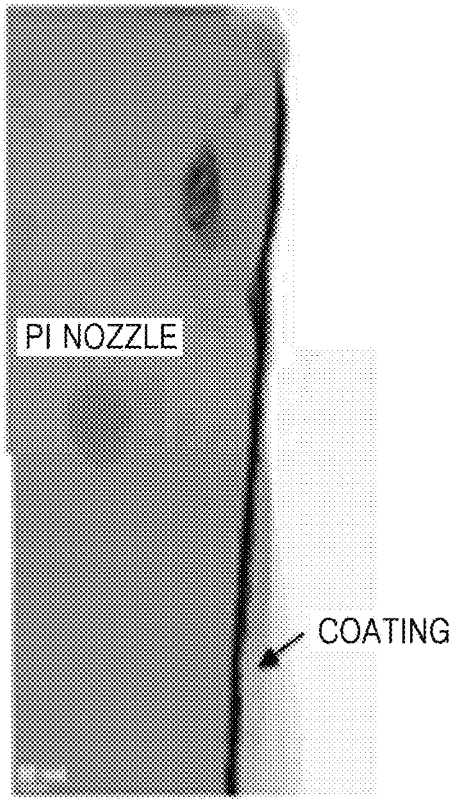

FIG. 8 is a photograph of an enlarged image of the nozzle portion of the inkjet printing head according to the Comparative Example, which shows a result of performing a printing operation for a certain period of time using a blue-based ink.

Generally, an ink composition including Zn is seldom included in a blue-based ink composition. Accordingly, as shown in FIG. 8, clogging hardly occurs in the nozzle even when the blue-based ink is used for a certain period of time.

As shown in FIGS. 5 to 8, in the case of the inkjet printing head in which the ink using the ink composition including Zn (particularly, ZnSe) is used, the inner surface of the nozzle or the coating on the inner surface of the nozzle may be peeled off due to the particles in the ink. Therefore, an additional protective layer or coating layer is desirable, like in the inkjet printing head according to an embodiment.

Figure 9:
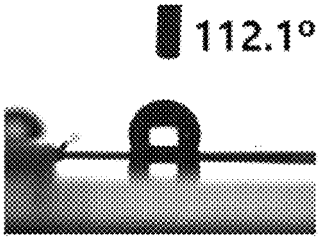
FIG. 9 is a table showing a result of comparing features of a PFA layer used for the inkjet printing head according to the Comparative Example and a first self-assembly monolayer used for an inkjet printing head according to an embodiment.
Figure 9:
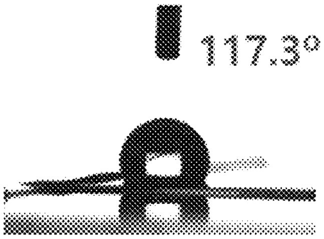

FIG. 9 is a table showing a result of comparing features of the PFA layer used for the inkjet printing head according to the Comparative Example and the first self-assembly monolayer 230 used for the inkjet printing head according to an embodiment.

According to FIG. 9, it is found that a DI contact angle of the PFA layer of the inkjet printing head according to the Comparative Example is about 112°. Compared with this, the first self-assembly monolayer 230 of the inkjet printing head according to an embodiment (see SAM1 shown in FIG. 9) has an angle of about 117° that is a DI contact angle greater than a DI contact angle of the PFA layer. That is, the first self-assembly monolayer 230 has a lower superficial energy and stronger hydrophobicity than the PFA layer in the related art. A lower superficial energy of a surface of a layer indicates that the surface is smoother. In addition, the first self-assembly monolayer 230 has a rigidity greater (refer to Pencil Hardness shown in FIG. 9) than a rigidity of the PFA layer.

In the case of the inkjet printing head, after performing a printing operation, a physical maintenance and cleaning process may be applied. A position to which the physical maintenance and cleaning is applied is the bottom surface BTL of the spray assembly NA, i.e., a position through which the ink is discharged from the inkjet printing head. In a case where the bottom surface BTL of the spray assembly NA is coated with a PFA layer in the related art, when the physical maintenance and cleaning process is applied, the coating is relatively easily peeled off compared with the first self-assembly monolayer 230. Accordingly, application of the physical maintenance and cleaning process may influence a hole of the inkjet printing head through which the ink is discharged, or may physically influence the bottom surface BTL of the spray assembly NA. This may have harmful influences on printing accuracy when spraying the ink discharged from the inkjet printing head. To prevent and minimize such harmful influences, it is desirable that a layer for protecting the bottom surface BTL of the spray assembly NA is the first self-assembly monolayer 230.

Figure 10:
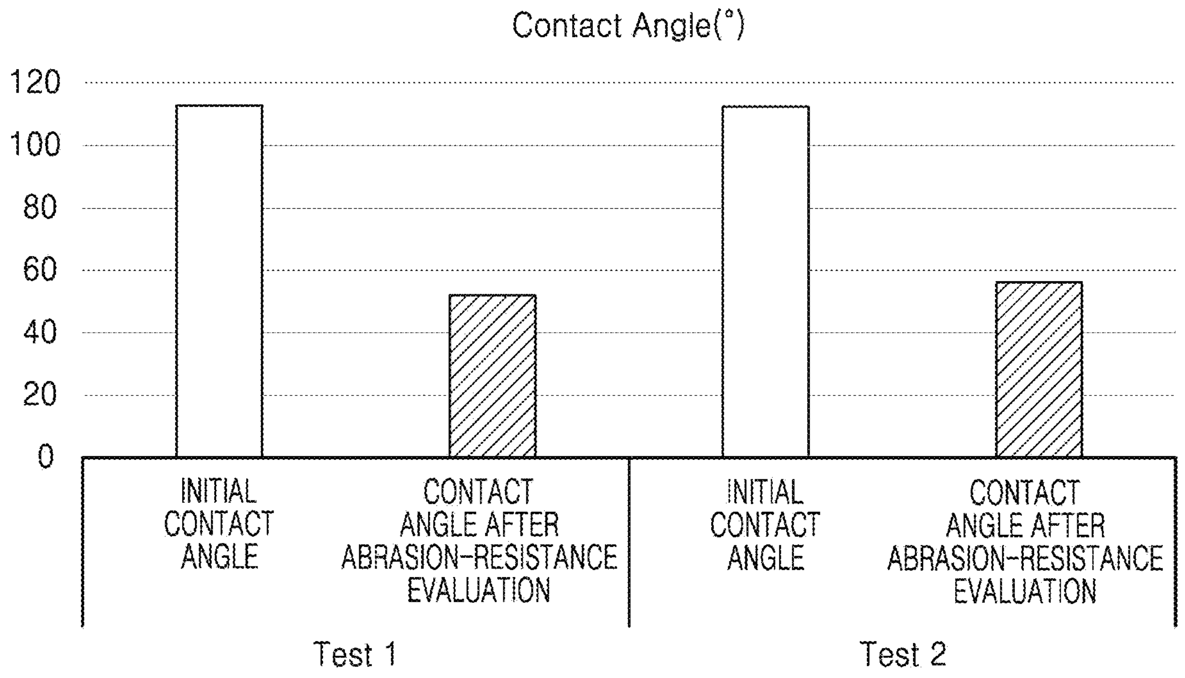
FIG. 10 is a graph showing a result of comparing a DI contact angle before and after abrasion-resistance evaluation of the PFA layer used for the inkjet printing head according to the Comparative Example.
Figure 11:
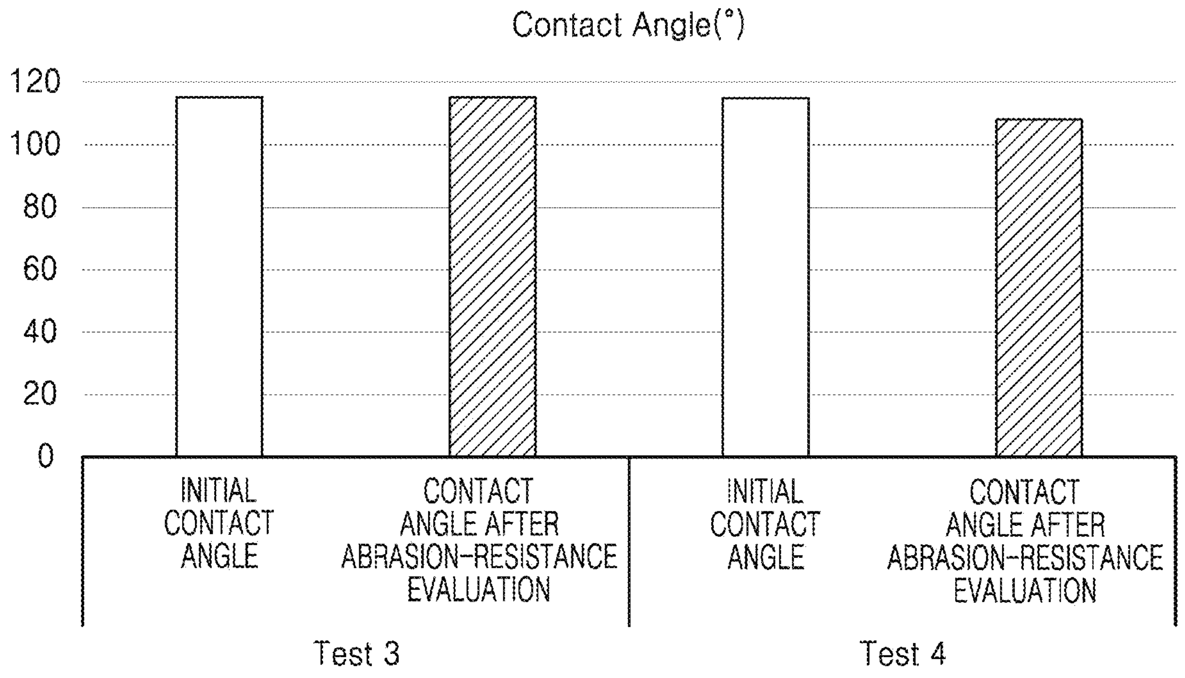
FIG. 11 is a graph showing a result of comparing a DI contact angle before and after abrasion-resistance evaluation of the first self-assembly monolayer used for an inkjet printing head according to an embodiment.

FIG. 10 is a graph showing a result of comparing a DI contact angle before abrasion-resistance evaluation of the PFA layer used for the inkjet printing head according to the Comparative Example; and FIG. 11 is a graph showing a result of comparing a DI contact angle before abrasion-resistance evaluation of the first self-assembly monolayer 230 used for the inkjet printing head according to an embodiment.

The abrasion-resistance evaluations of FIGS. 10 and 11 are both performed under same conditions of performing two thousand times of wiping using a same eraser of 1 kg for cleaning the inkjet printing head.

Referring to FIG. 10, disclosed are the results of abrasion-resistance evaluations performed twice on the PFA layer. The PFA layer before the abrasion-resistance evaluation has a DI contact angle of about 110°, while the PFA layer after the abrasion-resistance evaluation has a DI contact angle of about 50°. Like this, the PFA layer has a relatively less rigidity, and thus is fragile to physical external impacts.

Referring to FIG. 11, disclosed are the results of abrasion-resistance evaluations performed twice on the first self-assembly monolayer 230. The first self-assembly monolayer 230 before the abrasion-resistance evaluation has a DI contact angle of about 110°, and the first self-assembly monolayer 230 after the abrasion-resistance evaluation has a DI contact of about 110°. Like this, the first self-assembly monolayer 230 has a relative greater rigidity, and thus is strong against physical external impacts.

Although FIG. 11 shows the result of abrasion-resistance evaluation performed using the first self-assembly monolayer 230, it is expected that the result of FIG. 11 will also be applied to the second self-assembly monolayer 240. This is because the second self-assembly monolayer 240 has a composition identical or similar to a composition of the first self-assembly monolayer 230 and the only difference therebetween is lengths of carbon chains when the composition of the second self-assembly monolayer 240 is similar to the composition of the first self-assembly monolayer 230.

FIG. 12 illustrates a shot group of the inkjet printing head according to the Comparative Example and accuracy of the shot group, and FIG. 13 illustrates a shot group of the inkjet printing head according to an embodiment and accuracy of the shot group.

FIGS. 12 and 13 illustrate the shot groups in which printed dots are marked when a process of printing a dot is performed using different inkjet printing heads under same conditions. Experiments have been performed only with replacement of the heads using a same control program and a same printing device, and types of the ink and software that have been used are the same.

Referring to FIG. 12, when the inkjet printing head according to the Comparative Example is used, the accuracy of ink dots is about 93.4% with reference to the x axis and about 96.9% with reference to the x axis. From a shot group that has been formed, dots have been generally printed at the target point (0, 0), but some printed dots have considerably deviated from the target point.

Ratios of composition of elements included in the adhesive layer 210 included in the inkjet printing head according to an embodiment used in FIG. 13 is as shown in Table 2.

TABLE 2

| Example_$Al_xO_x(C_xH_x)$ | Al | C | O |
|---|---|---|---|
| 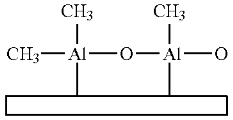 | about 33 at % | about 8 at % | about 58 at % |

—An Example of Detailed Numerical Values of Contents of Compositions in the Adhesive Layer 210—

The ratio of composition shown in FIG. 2 is an example for the experiment, and the content of carbon may be adjusted within the aforementioned range of the content of carbon. When converted into wt %, the content of carbon in Table 2 is about 5.3 wt %, and this numerical value is included in the range of the content of carbon described above with reference to Table 1.

Referring to FIG. 13, when the inkjet printing head according to an embodiment is used, the accuracy of an ink dot is about 96.5% with reference to the x axis and about 96.5% with reference to the y axis. From the shot group that has been formed, it is seen that dots have been generally printed with reference to a target point (0, 0), and as shown in the shot group shown in FIG. 12, no dot is identified as printed at a position significantly deviated from the target point (0, 0). Comparing FIG. 12 with FIG. 13, when the inkjet printing head according to an embodiment is used, significant improvement in the accuracy on the x axis has been identified.

In addition, adsorption ratios of Ag and Al in each of the PI layer, the first self-assembly monolayer 230, and the second self-assembly monolayer 240 are as shown in Table 3. A fluoride-based material is used for the first tail group of the first self-assembly monolayer 230 used in Table 3, the second tail group of the second self-assembly monolayer 240 includes hydrocarbon, and a length of the first carbon chain of the first self-assembly monolayer 230 is greater than a length of the second carbon chain of the second self-assembly monolayer 240.

TABLE 3

| | Adsorption ratio (%) | | | | |
|---|---|---|---|---|---|
| | | the first self-assembly monolayer | | the second self-assembly monolayer | |
| Type | PI layer | Binding E | +diffusion | Binding E | +diffusion |
| Silver (Ag) | 137.85 | 29.22 | 5.67 | 122.00 | 99.49 |
| Al | 100.00 | 21.20 | 4.11 | 88.50 | 72.18 |

—Comparison on Adsorption of Layers—

According to Table 3, as a result of comparing adsorption ratios of Ag and Al with reference to the PI layer, it is found that an expected adsorption ratio of the first self-assembly monolayer 230 is about 4% with reference to the PI layer and an expected adsorption ratio of the second self-assembly monolayer 240 is about 72% with reference to the PI layer. That is, as a layer having a lower adsorption ratio is used, the layer does not adsorb Ag or Al in the ink, and thus, clogging in the ink transport path NZ may be reduced.

As described above, according to an embodiment, an inkjet printing head with improved durability may be implemented. However, the scope of the disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An inkjet printing head comprising a chamber configured to store ink;

a spray assembly, which is disposed under the chamber, and defines an ink transport path therein connected to an inner portion of the chamber, wherein ink that passes through the ink transport path is discharged to an outside through a bottom surface of the spray assembly;

a first self-assembly monolayer covering the bottom surface of the spray assembly;

an adhesive layer disposed between the bottom surface of the spray assembly and the first self-assembly monolayer and comprising a metal-carbon composition; and an inorganic material layer disposed between the adhesive layer and the first self-assembly monolayer.

2. The inkjet printing head of claim 1, further comprising a second self-assembly monolayer covering at least a portion of an inner surface of the ink transport path.

3. The inkjet printing head of claim 2, wherein the adhesive layer is disposed between an inner surface of the ink transport path and the second self-assembly monolayer.

4. The inkjet printing head of claim 3, wherein the spray assembly further comprises a piezoelectric element layer disposed under the chamber; and a nozzle plate, which is disposed under the piezoelectric element layer and of which a bottom surface is the bottom surface of the spray assembly.

5. The inkjet printing head of claim 4, wherein the piezoelectric element layer defines a first nozzle portion connected to the inner portion of the chamber, as a portion of the ink transport path, the nozzle plate defines a second nozzle portion connected to the first nozzle portion and penetrating the bottom surface of the nozzle plate, as another portion of the ink transport path, and an average diameter of the first nozzle portion is greater than an average diameter of the second nozzle portion.

6. The inkjet printing head of claim 5, wherein the nozzle plate defines a 2-1 nozzle portion connected to the first nozzle portion, as a portion of the second nozzle portion, and a 2-2 nozzle portion connected to the 2-1 nozzle portion and penetrating the bottom surface of the nozzle plate, as another portion of the second nozzle portion, and an average diameter of the 2-1 nozzle portion is greater than an average diameter of the 2-2 nozzle portion.

7. The inkjet printing head of claim 6, wherein a diameter of the 2-1 nozzle portion decreases in a direction toward the 2-2 nozzle portion from the first nozzle portion.

8. The inkjet printing head of claim 6, wherein the second self-assembly monolayer covers an inner surface of the first nozzle portion and an inner surface of the second nozzle portion.

9. The inkjet printing head of claim 8, wherein the inorganic material layer includes a first part disposed between the adhesive layer and the first self-assembly monolayer to cover the bottom surface of the nozzle plate and a second part disposed between the adhesive layer and the second self-assembly monolayer to cover an inner surface of the 2-2 nozzle portion.

10. The inkjet printing head of claim 6, wherein the second self-assembly monolayer covers an inner surface of the first nozzle portion and an inner surface of the 2-1 nozzle portion, and the first self-assembly monolayer covers an inner surface of the 2-2 nozzle portion.

11. The inkjet printing head of claim 10, wherein the inorganic material layer disposed between the adhesive layer and the first self-assembly monolayer covers the bottom surface of the nozzle plate.

12. The inkjet printing head of claim 2, wherein the chamber comprises a mesh layer arranged in parallel to the bottom surface of the spray assembly in the chamber, and a metal layer arranged in parallel to the mesh layer under the mesh layer in the chamber, a surface of the mesh layer and a surface of the metal layer are coated by the second self-assembly monolayer, and the adhesive layer is further disposed between the surface of the mesh layer and the coated second self-assembly monolayer and between the surface of the metal layer and the coated second self-assembly monolayer.

13. The inkjet printing head of claim 1, wherein the adhesive layer comprises carbon of 1 weight percent (wt %) to 50 wt %.

14. The inkjet printing head of claim 13, wherein the metal-carbon composition comprises aluminum oxide.

15. The inkjet printing head of claim 1, wherein a deionized water (DI) contact angle of the first self-assembly monolayer is equal to or greater than 10° and smaller than or equal to 200°.

16. The inkjet printing head of claim 15, wherein a DI contact angle of the second self-assembly monolayer is equal to or greater than 10° and smaller than or equal to 130°.

17. The inkjet printing head of claim 1, wherein the inorganic material layer comprises silicon, the first self-assembly monolayer comprises a first compound, in which a first head group including silicon faces the inorganic material layer and which comprises a first tail group in which a hydrophobic function group is exposed to outside, and the first head group and the first tail group are connected by a first carbon chain.

18. The inkjet printing head of claim 17, further comprising a second self-assembly monolayer covering at least a portion of an inner surface of the ink transport path, wherein the second self-assembly monolayer comprises a second compound, in which a second head group including silicon faces the inorganic material layer and which comprises a second tail group in which a hydrophobic function group is exposed to outside, the second head group and the second tail group are connected to each other by a second carbon chain, and a length of the first carbon chain is less than or equal to a length of the second carbon chain.

19. The inkjet printing head of claim 1, wherein the ink comprises an ink composition comprising zinc.

20. The inkjet printing head of claim 1, wherein the ink comprises zinc selenide.

* * * * *